United States Patent [19]

Wada et al.

[11] Patent Number: 5,302,560

[45] Date of Patent: * Apr. 12, 1994

[54] PROCESS FOR THE PRODUCTION OF MAGNETIC HEAD SLIDERS

[75] Inventors: Toshiaki Wada, Takatsuki; Yoshiaki Katsuyama, Muro; Mitsuhiko Furukawa; Takashi Kitahira, both of Fukuoka; Michito Miyahara, Nakagawa; Kiyohito Misumi, Kurume; Masaharu Shiroyama, Fukuoka, all of Japan

[73] Assignees: Sumitomo Special Metals Co., Ltd., Osaka; Nippon Tungsten Co., Ltd., Fukuoka, both of Japan

[*] Notice: The portion of the term of this patent subsequent to Aug. 22, 2006 has been disclaimed.

[21] Appl. No.: 817,976

[22] Filed: Jan. 8, 1992

Related U.S. Application Data

[60] Continuation of Ser. No. 367,123, Jun. 16, 1989, abandoned, which is a division of Ser. No. 155,851, Feb. 16, 1988, Pat. No. 4,859,638, which is a continuation of Ser. No. 727,756, Apr. 26, 1985, abandoned.

[30] Foreign Application Priority Data

Apr. 27, 1984 [JP] Japan ................................. 59-83674

[51] Int. Cl.$^5$ .............................................. C04B 35/56
[52] U.S. Cl. ......................................... 501/88; 501/89; 501/91; 501/92
[58] Field of Search ...................... 501/88, 89, 91, 92

[56] References Cited

U.S. PATENT DOCUMENTS

| | | | |
|---|---|---|---|
| 4,097,293 | 6/1978 | Komeya et al. | 501/87 |
| 4,238,434 | 12/1980 | Enomoto et al. | 501/88 |
| 4,346,049 | 8/1982 | Coppola et al. | 501/88 |
| 4,354,991 | 10/1982 | Suzuki et al. | 501/89 |
| 4,467,043 | 8/1984 | Kriegesmann et al. | 501/89 |
| 4,539,298 | 9/1985 | Komeya et al. | 501/89 |
| 4,564,490 | 1/1986 | Omori et al. | 501/88 |
| 4,569,921 | 2/1986 | Omori et al. | 501/88 |
| 4,874,725 | 10/1989 | Furukawa et al. | 501/88 X |

Primary Examiner—Karl Group
Attorney, Agent, or Firm—Burns, Doane, Swecker & Mathis

[57] ABSTRACT

A sintered material for recording/reading (particularly magnetic) head slider is produced by:

preparing a powdery mixture which comprises 0.5 to 6.0% by weight of at least one component selected from the component group A consisting of the following elements and compounds thereof, a garnet type compound consisting essentially of erbium oxide and aluminum oxide in amounts of 2 to 12% by weight and 0 (exclusive) to 2 (inclusive) % by weight based on the total composition, respectively, and expressed by the formula $Er_3(Al,Er)_2(AlO_4)_3$ through $(Er, Al)_3Al_2(AlO_4)_3$, and the balance being silicon carbide powder:

the elements for the component group A being Ti, V, Cr, Mn, Mg, Y, Zr, Nb, Mo, Ba, La, Ce, Gd, Hf, Ta, W, Th, and Cs; and sintering the resultant mass under the application of a high pressure.

Further sintering aids of Be, BeO, B and $B_4C$ may be present. For the garnet type compound, erbium oxide may be used, preferably in combination with alumina.

34 Claims, 4 Drawing Sheets

PROCESS FOR THE PRODUCTION OF MAGNETIC HEAD SLIDERS

This application is a continuation of application Ser. No. 07/367,123, filed Jun. 16, 1989, now abandoned, which is a divisional of application Ser. No. 07/155,851, filed Feb. 16, 1988, now U.S. Pat. No. 4,859,638, which is a continuation of application Sr. No. 06/727,756, filed Apr. 26, 1985, now abandoned.

FIELD OF THE INVENTION

The present invention relates to recording/reading (particularly magnetic) head sliders, materials therefor, and a process for the production thereof.

BACKGROUND OF THE DISCLOSURE

Polycrystalline Ni-Zn and Mn-Zn ferrite or single-crystalline Mn-Zn ferrite or high-hardness permalloy have so far been used for the magnetic heads of recording (write)/reproducing (read) systems in computer, audio and VTR systems or the like.

Now, there are strong demands for high densification of recording density and improvements in wear resistance. For that reason, thin-film magnetic heads are currently under development. The magnetic head usually comprises a slider and a thin film magnetic circuit provided thereon. The materials are now being selected for magnetic circuit parts and slider parts or wear-resistant parts for recording/reproducing, each to meet the individually requisite properties. More specifically, the thin films of permalloy or sendust excelling in the magnetic properties in a high-frequency range are used for magnetic circuits, and alumina- or carbide-base materials have been considered suitable for use in wear-resistant parts. $Al_2O_3$-TiC base materials disclosed as the material for magnetic head sliders in Japanese Patent Kokai-Publication No. 55 (1980)-163665 are one of those best-suited for wear-resistant parts.

SUMMARY OF THE DISCLOSURE

However, the $Al_2O_3$-TiC base materials are not always ideally complete in respect to their compatibility and lubricating properties with respect to recording media. Referring especially to the thin film recording media expected to be practically used in the near future, viz., plated or sputtered media, several problems would arise in connection with thinning thereof or the application of a lubricating protective film thereto. The soft ferrite having been used over a long period has a hardness Hv of 600 to 800, whereas the $Al_2O_3$-TiC base materials described in the aforesaid Kokai-Publication has a hardness Hv of as high as 1900 to 2100. Depending upon the type of recording media, therefore, difficulty is involved in the application of the latter materials.

In view of the foregoing considerations, a primary object of the present invention is to provide novel wear-resistant parts, especially magnetic head sliders, which meet the diverse properties required for such magnetic head sliders, and in particular excel in the compatibility (or affinity) and lubricating properties with respect to recording media as well as the materials therefor and the process for the production thereof.

Another object of the present invention is to provide materials for high-quality recording/reading head sliders, particularly magnetic head sliders, which have reduced pores and particularly suitable for use in thin film magnetic heads.

Still another object of the present invention is to provide highly densified materials with minimized pores for recording/reading head sliders, particularly magnetic (inter alia thin film) head sliders, which have a pore size reduced to no more than 2 microns ($\mu$m) or particularly no more than 1 micron as well as a process for the production thereof.

Other objects of the present invention will become apparent in the entire disclosure.

According to a first aspect of the present invention, the material for recording/reading head sliders is characterized by consisting essentially of:

0.5 to 6.0% by weight of at least one component selected from the component group A consisting of the following elements and compounds thereof, 5 to 15% by weight of erbium oxide, and the balance being silicon carbide:

the elements for the component group A being Ti, V, Cr, Mn, Mg, Y, Zr, Nb, Mo, Ba, La, Ce, Gd, Hf, Ta, W, Th and Cs.

According to a second aspect of the present invention, the present invention is characterized in that, in said first aspect, a part (no more than 2% by weight with respect to the entire composition) of silicon carbide is substituted with a further sintering aid selected from the group consisting of at least one of Be, BeO, B, $B_4C$, Al, AlN and $Al_2O_3$.

According to a third aspect of the present invention, the present invention is characterized in that erbium oxide (2–12 wt. %), aluminium oxide (0 (exclusive) to 2 (inclusive) wt. % and at least one (0.5 to 6.0 wt. %) component selected from the component group A consisting of the following elements or compounds thereof are added to silicon carbide, said erbium oxide and aluminium oxide being present as a garnet type compound expressed by the formulae $Er_3(Al, Er)(AlO_4)_3$ through $(Er, Al)_3Al_2(AlO_4)_3$.

According to a fourth aspect of the present invention, the material for recording/reading head sliders of the present invention is characterized in that, in the third aspect, a part (no more than 2 wt. % with respect to the entire composition) is substituted with a further sintering aid consisting of at least one of Be, BeO, B, $B_4C$, Al, AlN and $Al_2O_3$.

According to further aspects of the present invention, the present invention provides the processes of the production of the materials for recording/reading head sliders according to the aforesaid 1st to 4th aspects.

It is to be understood that the term "compounds" in the wording "the elements and compounds selected from the component group A" refers to "oxides, nitrides, borides or carbides, or complex compounds thereof".

Said component of the components group A comprises at least one selected from the group consisting of TiC, $TiO_2$, TiN, $VB_2$, VN, $V_2O_5$, $Cr_3C_2$, CrB, $Cr_2O_3$, MnO, Mn, Mg, MgO, Y, $Y_2O_3$ ZrC, $ZrB_2$, $ZrO_2$, NbC, NbB, NbB, NbN, $Nb_2O_3$ $Mo_2C$, MoB, Mo, Ba, BaO, $La_2O_3$, La, $CeB_6$, $Ce_2O$, $Gd_2O_3$, HfC, $HfB_2$, HfN, $HfO_2$, TaC, TaB, TaN, $Ta_2O_5$, WC, WB, W, ThC, $ThB_4$, ThN, and Cs. Preferred elements of the components group A include V, Nb, Mo, Ba, Gd, Hf, Ta, W, Mg and Ti, and components thereof, more preferred being Ti or compounds thereof. (The same applies to the 1st through 4th aspects and the other aspects of the present invention.)

In accordance with the present invention, addition of erbium oxide or garnet powder consisting of erbium oxide and aluminium oxide as well as various elements for promotion of sintering serves to increase the density of a sintered body and provide fine crystal grains, whereby the obtained sintered body is substantially free from any micropores and is thus tough. The sintered body also excels in the compatibility (or affinity) with respect to recording media as well as lubricating properties. Although that mechanism has not evidently clarified, yet the following consideration may generally be given. That is, heating of silicon carbide and erbium oxide or garnet to elevated temperatures would cause that erbium oxide or garnet enter the crystal lattices of silicon carbide, while sintering proceeds. In that case, erbium oxide or garnet would serve to reduce the growth of crystal grains. Only with such means, however, there still remain a number of micropores. Further audition of the second various elements or the compounds thereof (component group A) would reduce such micropores to a significant degree. Thus, it is required that erbium oxide or garnet as well as a variety of the second elements as the sintering aid be uniformly dispersed throughout silicon carbide.

Reference will first be made to the 1st and 2nd aspects of the present invention, which are characterized in that erbium oxide and the aforesaid component group A are added to silicon carbide.

The amount of erbium oxide to be used has to be at least 5% by weight for the reasons that, then, the density relative to theoretical density is reduced, and other properties including flexural strength are poor. In an amount of as high as 18 % by weight, however, there occur an increase in the crystal grain size with a corresponding decrease in flexural strength and impact value as well as other substantial properties. For those reasons, the amount of erbium oxide should be within 15% by weight. The additive elements as the sintering aid are not substantially effective in an amount of 0.3% by weight, and are thus required to be at least 0.5% by weight, but they cause crystal grain growth in an amount exceeding 6% by weight leading to a lowering of the properties. Thus, their amount should be within the range of 0.5 to 6% by weight. Even in the substitution of a part of silicon carbide by Be, BeO, B, $B_4C$, Al, AlN and $Al_2O_3$, it has been ascertained that a dense sintered body can be obtained in the fine grain form by addition of an appropriate amount of erbium oxide. In this case, unless the amount of the substituent reaches about 0.5% by weight, no noticeable difference is observed, as compared with no addition of the substituent; however, too large an amount thereof, say, an amount of as much as 3.0%, causes drops of flexural strength and hardness. For these reasons, the amount of the substituent should be up to 2% by weight, and should preferably be within the range of 0.5 to 2.0% by weight.

The materials for recording/reading head sliders according to the 1st and 2nd aspects of the present invention may be produced by either the normal sintering process or the sintering process under the application of high pressure, but preference is given to the latter process.

Considering now the sintering process under the application of high pressure, which process comprises hot-pressing (HP) or hot isostatic pressing (HIP), a sintering temperature has to be higher than 1900° C. so as to obtain a dense and high-strength sintered body. On the contrary, too high a temperature, e.g., 2100° C., causes vigorous growth of grains prior to sufficient densification, so that pores exceeding 2 microns remain therein. Turning to the pressure during sintering, on the other hand, a pressure of 100 kg/cm$^2$ or higher would suffice, and no particular upper limit is imposed thereupon. It is also desired that the hot pressing process be carried out in vacuum or in an inert gas atmosphere, while the HIP process be done in an inert gas atmosphere. In the normal sintering process, which is crone without applying kinetic force upon the mass to be sintered, a substantially similar sintered body m ay be obtained. Sintering is then effected, on the one hand, at 2000° to 2300° C. in an inert gas which is not pressurized, and, on the other hand, at 2000° to 2250° C. in an inert gas which is pressurized.

According to the 1st and 2nd aspects of the present invention, it is possible to obtain the materials for recording/reading head sliders, which have therein pores of no larger than 2 microns.

Reference will now be made to the 3rd and 4th aspects of the present invention, which are characterized by addition of garnet consisting substantially of erbium oxide and aluminium oxide as well as the aforesaid components A.

These aspects are characterized in that, unlike the 2nd aspect of the present invention wherein erbium oxide and aluminium oxide are separately added, both components are present in the form of a garnet type compound expressed essentially in terms of the following formulae $Er_3$ (Al, $Er)_2(AlO_4)_3$ ... (1) through (Er,Al)$_3$Al$_2$(AlO$_4$)$_3$... (2). The production of the sintered materials according to these aspects are also characterized in that the powder of such a garnet type compound is used as the starting material, and a compact of a powdery mixture is then sintered under the application of high pressure.

As the powders of the garnet type compound expressed in terms of the formulae (1) through (2), use may be made of polycrystalline powders obtained by the solid-phase reaction, at high temperatures (normally 1300° to 1600° C.) , of, for instance, aluminium oxide powder with erbium oxide powder. Such solid-phase reaction does not always yield a product having a composition of $Er_3$ $Al_2(AlO_4$ )$_3$. In most cases, there are obtained garnet type compounds expresses in terms of the formulae (1) through (2) wherein both oxides are partly replaced by each other into a solid solution. In the present invention, garnet of $Er_3Al_2(AlO_4)_3$ may be used in addition to those expressed by the formulae (1) through (2) The aforesaid garnet composition may further contain partly (up to about 10% of garnet) a compound having a composition expressed by $Er_xAl_{(1-x)}O_3$(wherein $x<1$).

In accordance with the 3rd and 4th aspects of the present invention, it is possible to increase further the density of sintered bodies by addition of various elements as well as the powder of garnet consisting of erbium oxide and aluminium oxide, and to obtain the sintered bodies the core size of which is reduced to a micropore size of no larger than 1 micron, in particular no larger than about 0.5 microns. Such materials are especially best-suited as those for high-performance magnetic head sliders.

In this case, unless the amount of garnet of erbium oxide and aluminium oxide to be used has to be at least 2% by weight, then the relative density (with respect to theoretical density) is reduced and other properties including flexural strength are unsatisfactory. In an amount of as high as 15% by weight, however, there is again a grain growth with a corresponding decrease in flexural strength and impact value as well as other substantial properties. Thus, the amount of garnet should be within 12% by weight, preferably 4 to 10% by weight.

Where the amount of aluminium oxide component reaches as high as 3% by weight, on the other hand, a lowering of the properties such as flexural strength is observed. The lower limit of this component is determined by the adding effect of garnet consisting of erbium oxide and aluminium oxide, and has to be no more than 2% by weight with the exception of 0%.

The second additive elements (component group A) or their compounds as the further sintering aid are not substantially effective in an amount of 0.3% by weight, and is thus required to be at least 0.5% by weight, but they again causes a grain growth in an amount exceeding 6% by weight, thus leading to a lowering of the properties. Thus, their amount should be within the range of 0.5 to 6% by weight, more particularly 1.0 to 3.0% by weight. Within the above-mentioned preferable ranges for erbium oxide and aluminium oxide, it is possible to obtain a highly densified sintered body consisting of still finer crystal grains, which is best-suited for precision machining.

In the substitution of a part of silicon carbide by Be, BeO, B and/or B$_4$C, it has been ascertained that a dense sintered body can be obtained in the fine crystal grain form by addition of an appropriate amount of garnet consisting of erbium oxide and aluminium oxide. In this case, unless, the amount of substituent reaches about 0.5% by weight, no appreciable difference is observed, as compared with no addition of the substituent; however, too large an amount thereof, say, an amount of as large as 3.0% by weight, causes drops of flexural strength and hardness. For these reasons, the amount of the substituent should be up to 2% by weight, and should preferably be within the range of 0.5 to 2.0% by weight. This substitution serves to improve sinterability, and is particularly effective in reducing the number of pores (see Table 4).

The materials for magnetic head sliders according to the 3rd and 4th aspects of the present invention may be produced by the sintering process under the application of high pressure e.g., the HP or HIP process) under the same conditions as employed in accordance with the 1st and 2nd aspects. Although the normal sintering process may yield a sintered body, it is unsuitable for achieving a pore diameter of no higher than 1 micron, since the resulting pores cannot be reduced nor become smaller than the 1st and 2nd aspect and the crystal grain size becomes about 5 microns.

It is to be understood that the SiC powder (the starting material) used in the present invention may contain up to about 2% by weight of free carbon.

BRIEF DESCRIPTION OF THE DRAWINGS

The foregoing and other objects and features of the present invention will become apparent from the following detailed description with reference to the accompanying drawings, which are given for the purpose of illustration alone, and in which.

Figure 1:
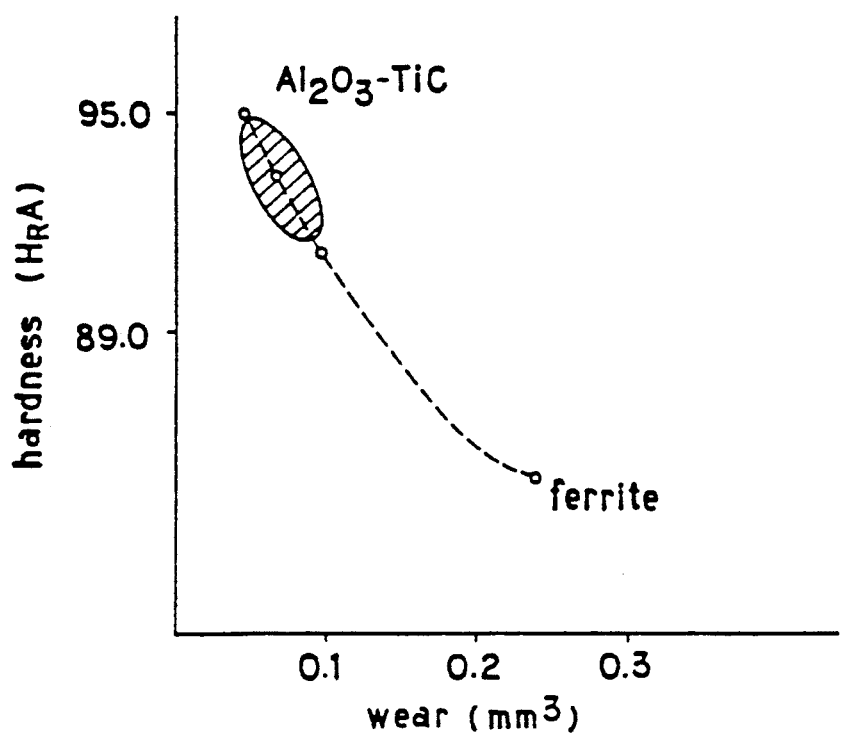
FIGS. 1 and 5 are graphs showing the relations between the wear resistance and hardness of materials.

In the following, the present invention will be explained with reference to the non-restrictive examples.

EXAMPLE 1

1st and 2nd Aspects

5% by weight of Er$_2$O$_3$ powder having a purity of 99.9% by weight and an average particle size of 5 microns and 3% by weight of MgO powder having a purity of 99% by weight and an average particle size of 3 microns were added to SiC powder having a purity of 98.5% by weight and an average particle size of 0.5 microns, and wet-mixed and pulverized for 15 hours in a ball mill mixer. Thereafter, the resulting mixtures were sufficiently dried into the materials for sintering, which were charged in a 50$\times$50$\times$60 (height) mm graphite mold, which was then inserted through a high-frequency coil and maintained there at a temperature of 1,950° C. under a pressure of 200 kg/cm$^2$ for 60 minutes, and depressurized and cooled off resulting in sintered bodies of 50$\times$50$\times$5.5 mm. The respective sintered bodies were cut and ground with a diamond grinding wheel to prepare 10 test pieces, each of 3$\times$4$\times$36 mm, which were subjected to various testings. The resulting measurements are set forth in Table 1.

TABLE 1

| Properties | |
|---|---|
| Density Relative to Theoretical | 97.5% |
| Hardness | HR 30N 95.6 |
| Flexural Strength | 81 kg/mm$^2$ |
| Thermal Conductivity | 0.285 cal/cm, sec, °C. |
| Electric Resistance | 30 Ω.cm |

Next, the test piece of an alumina base material (70Al$_2$O$_3$-30TiC) and the invented material (92SiC-3MgO-5Er$_2$O$_3$) were fixed in place by a jig, and were cut with a resinoid-bonded diamond grinding wheel, to which a 10 kg weight was attached through a pulley, to determine the time period required to cut off the alumina base test piece over a length of 50 mm under the action of the weight. In consequence, it has been found that if the time required to cut off the alumina base test piece over a length of 50 mm is 100, that for cutting the SiC base test piece is then only 35. This means that, although the invented material is hard, it takes a prominent position in respect of the machinability required for ceramic base materials for magnetic head sliders.

Next, the formed product of 92SiC-3MgO-5Er$_2$O$_3$, the invented product was shaped into a rectangular parallelopiped, 2$\times$4 mm in section and 20 mm in length, with one end being shaped into the form of a sharp edge. Subsequently, the so-called pin-disc type abrasion testing was carried out, wherein the inventive 92SiC-3 MgO-5 Er$_2$O$_3$ formed body was allowed to come at the sharp end into contact with a ring type ferrite disc, 45 mm in outer diameter, 10 nm in inner diameter and 10 mm in thickness, which could rotate relatively to the sintered bodies according to the present invention.

In carrying out the above-mentioned testing, similar testing was also applied to the conventional polycrystalline Mn-Zn ferrite base material (32MnO-15ZnO-52Fe$_2$O$_3$) and Al$_2$O$_3$-TiC base material. The results are illustrated in FIGS. 1 and 2.

Figure 2:
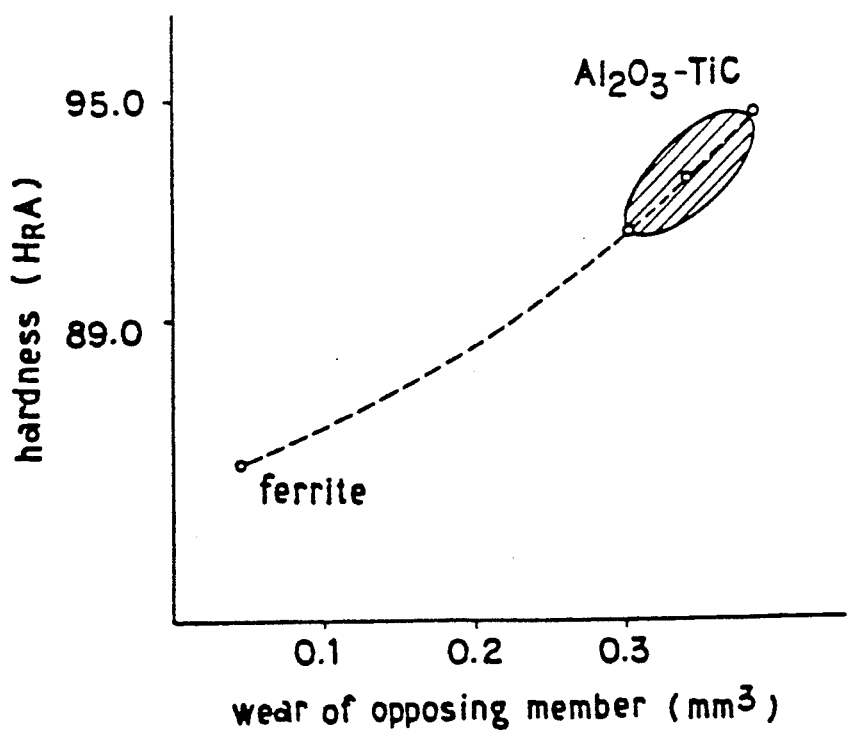
FIGS. 2 and 6 are graphs showing the relations between the wear volume of recording media and the hardness of head slider material.

More specifically, FIG. 1 shows the relation between wear volume and hardness of bead slider materials, and FIG. 2 illustrates the relation between the hardness of head slider materials and wear volume of the recording media side. In FIGS. 1 and 2, the hatched regions correspond appropriately to the various properties the invented materials possess. As seen from FIGS. 1 and 2, the materials according to the present invention have a hardness shifting from the intermediate value lying between the prior art ferrite base material and the aforesaid $Al_2O_3$-TiC base material to a value near to that of the latter. In addition, they have the properties suitably applied as the materials for magnetic head sliders, and excel in, in particular, the compatibility (or affinity) and lubricating characteristics with respect to thin-film recording media, as will be described later.

Into a powder of SiC having a purity of 98.5% and an average particle size of 0.5 microns were added 5% by weight of an $Er_2O_3$ powder of a 99.9% purity and an average particle size of 5 microns, and the second additives as the sintering aid, as set forth in Table 2. The resulting formulations were sintered in a manner similar to that for the aforesaid experiment. The sintered bodies were then surface-ground with a diamond grinding wheel and lapped to observe the presence of pores by an optical microscope at a magnification of 400×. In Table 2, Mark X indicates the presence of a large number of pores with a diameter exceeding 2 microns, whereas Mark O stands for the substantial absence of any pores. The fractures of the respective sintered bodies were examined by a scanning electron microscope. In Table 2, the sintered bodies capable of being used as the materials for magnetic head sliders in view of the crystal grain size (no larger than 5 microns) are marked with O, whereas those unsuitable for such use are marked with X.

TABLE 2-1

| Second addition component(s) for sintering aid/ by weight | Pore | Crystal grain size |
| --- | --- | --- |
| TiC/0.3 | X | O |
| TiO$_2$/4.0 | O | O |
| TiN/7 | O | X |
| VB$_2$/0.3 | X | O |
| VN/4.0 | O | O |
| V$_2$O$_5$/7.0 | O | X |
| Cr$_3$C$_2$/0.3 | X | O |
| CrB/4.0 | O | O |
| Cr$_2$O$_3$/7.0 | O | X |
| MnO/0.3 | X | O |
| Mn/7 | O | X |
| Mg/4.0 | O | O |
| MgO/7.0 | O | X |
| Y/4.0 | O | O |
| Y$_2$O$_3$/7.0 | O | X |
| ZrC/0.3 | X | O |
| ZrB$_2$/4.0 | O | O |
| ZrO$_2$/7.0 | O | X |
| NbC/0.3 | X | O |
| NbB/4.0 | O | O |
| NbN/3.0.Nb$_2$O$_3$/4.0 | O | X |
| Mo$_2$C/0.3 | X | O |
| MoB/4.0 | O | O |

TABLE 2-2

| Second addition component(s) for sintering aid/ % by weight | Pore | Crystal grain size |
| --- | --- | --- |
| Mo/7.0 | O | X |
| Ba/0.3 | X | O |
| BaO/4.0 | O | O |

TABLE 2-2-continued

| Second addition component(s) for sintering aid/ % by weight | Pore | Crystal grain size |
| --- | --- | --- |
| La$_2$O$_3$/4.0 | O | O |
| La/7.0 | O | X |
| CeB$_6$/0.3 | X | O |
| Ce$_2$O/4.0 | O | O |
| Gd$_2$O$_3$/4.0 | O | O |
| HfC/0.3 | X | O |
| HfB$_2$/4.0 | O | O |
| HfN/3.0.HfO$_2$/4.0 | O | X |
| TaC/0.3 | X | O |
| TaB/4.0 | O | O |
| TaN/3.0.Ta$_2$O$_3$/4.0 | O | X |
| WC/0.3 | X | O |
| WB/4.0 | O | O |
| W/7.0 | O | X |
| ThC/0.3 | X | O |
| ThB$_4$/4.0 | O | O |
| ThN/7.0 | O | X |
| CsN/0.3 | X | O |

Figure 3:
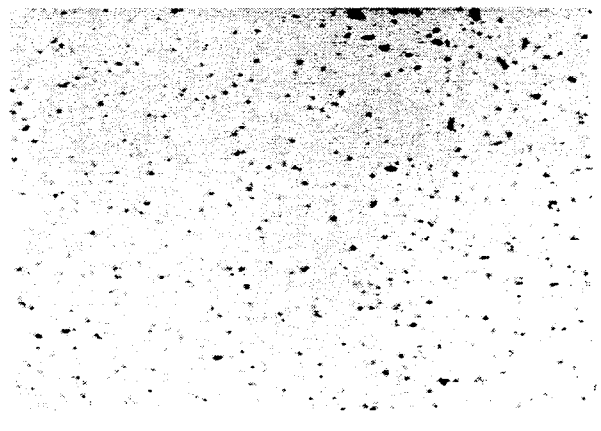
FIGS. 3 and 4 are photomicrographs of samples wherein, in Table 2-1 of Example 1, 0.3% by weight TiC and 4.0% by weight TiO$_2$ are contained, respectively.
Figure 4:
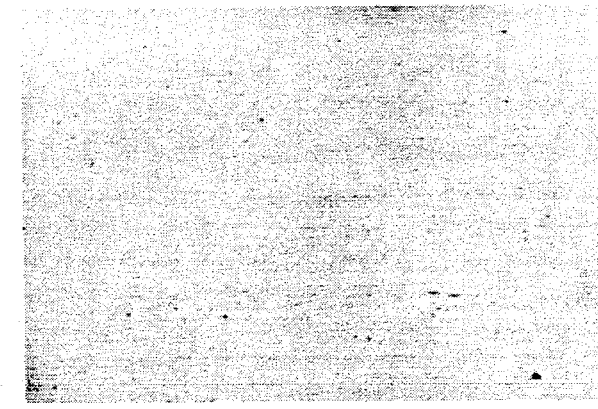

FIG. 3 illustrates a photomicrograph (×400) of the structure containing 0.3% by weight of TiC, and FIG. 4 illustrates a photomicrograph (×400) of the structure containing 4.0% by weight of TiO$_2$.

Furthermore, similar results were obtained by carrying out the experiments to those mentioned in connection with Table 2, wherein the powders of SiC containing 0.5 to 2.0% by weight of free carbon were used.

As mentioned above, the materials according to the present invention are best-suited for use in the materials for magnetic head sliders, since they possess proper wear resistance, good machinability and very small porosity. According to the present invention, such materials can be produced with ease and reliability.

In other experiments, to the powder of SiC having a purity of 98.5% and an average particle size of 0.5 microns were added 5% by weight of $Er_2O$ having a purity of 99.9% and an average particle size of 5 microns, 3% by weight of a powder of MgO having a purity of 99.9% and an average particle size of 3 microns and such various additives as set forth in Table 3, and the resulting formulations were sintered in a manner similar to that mentioned above. The sintered bodies were surface-ground with a diamond grinding wheel and lapped to observe the presence of pores by an optical microscope at a magnification of ×400. In Table 3, Mark X indicates the presence of a large number of pores, whereas Mark O stands for the substantial absence of any pores. The fractures of the respective sintered bodies were examined by a scanning electron microscope. In Table 3, the sintered bodies capable of being used as the materials for magnetic bead sliders in view of the crystal grain size are marked with O, whereas those unsuitable for such use are marked with X.

TABLE 3

| Second addition component(s) for sintering aid/ % by weight | Presence of pore | Crystal grain size |
| --- | --- | --- |
| B/1.0 | O | O |
| B/3.0 | O | X |
| B$_4$C/1.0 | O | O |
| B$_4$C/3.0 | O | X |
| Al/1.0 | O | O |
| Al/3.0 | O | X |
| AlN/1.0 | O | O |
| AlN/3.0 | O | X |
| Al$_2$O$_3$/1.0 | O | O |

TABLE 3-continued

| Second addition component(s) for sintering aid/ % by weight | Presence of pore | Crystal grain size |
| --- | --- | --- |
| Al₂O₃/3.0 | ○ | X |
| Be/1.0 | ○ | ○ |
| Be/3.0 | ○ | X |
| BeO/1.0 | ○ | ○ |
| BeO/3.0 | ○ | X |
| { BeO/1.0  Al₂O₃/1.0 | ○ | ○ |
| { BeO/2.0  AlN/2.0 | ○ | X |

Next, the formulations similar to those set forth in Table 3 were formed in a mold, pre-sintered to 95% of relative theoretical density, and H.I.P. sintered at 1950° C. in an argon atmosphere of 1,000 kg/cm² to make similar examinations. Similar results were then obtained.

Furthermore, the formulations similar to those set forth in Table 3 were compacted in a mold, sintered to 2,100° C. under pressure in an argon gas atmosphere of 9.5 kg/cm² for sintering for 2 hours to make similar examinations. Similar results were then also obtained.

pressurized and cooled off to end sintered bodies of 50×50×5.5 mm. The respective sintered bodies were cut and ground with a diamond grinding wheel to prepare 10 test pieces of 3×4×36 mm, which were subjected to various testings. The resulting measurements are set forth in Table 4.

For the purpose of comparison (No. P9 and other example No. 10), the mixed powders consisting of Al₂O₃ and Er₂O₃ having the compositions (parts by weight) as shown in Table 4 were used in place of garnet as the starting materials. With the application of the same materials and procedures as mentioned above, a comparison sintered body was obtained (Sample No. R9 in Table 4).

Figure 7:
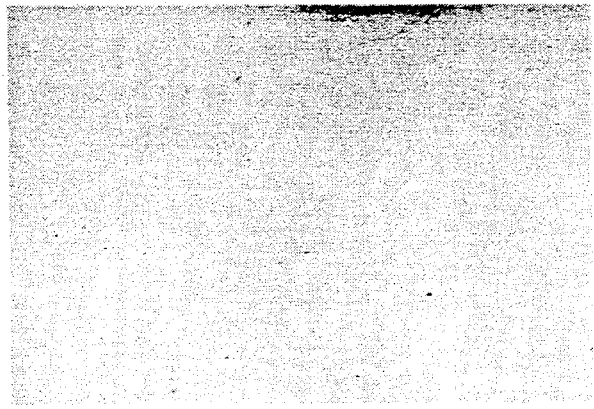
FIGS. 7 and 8 are photomicrographs of mirror-finished sample Nos. 6 and 10 in Table 3 ($\times$1000).
Figure 8:
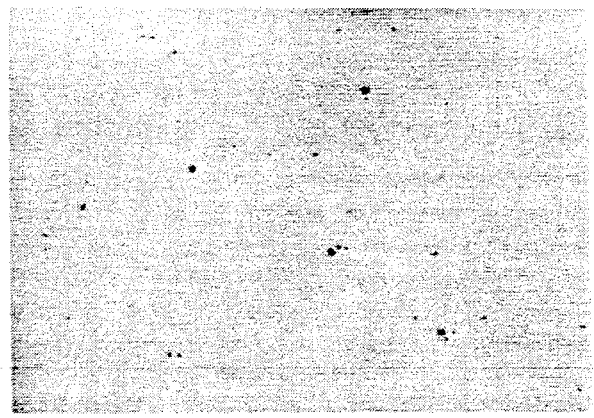

The silicon carbide base sintered bodies (Sample Nos. 2 and 4–7) obtained according to the process of the present invention have high strength and density, and include therein only very minute cores as expressed in terms of a pore size of about 0.5 microns. As understood from the comparison examples, however, the sintered bodies comprising the mixed powder consisting of aluminum oxide and erbium oxide include therein larger pores as expressed in terms of a pore size of about 2 microns. It is noted that FIGS. 7 and 8 are photomicrographs (×1000) of Sample Nos. 6 and 10 that were mirror-finished, respectively.

TABLE 4

| Sample No. | Proportion (% by weight) | | | | | | Relative Density (%) | Flexural Strength (kg/mm²) | Pore* |
| --- | --- | --- | --- | --- | --- | --- | --- | --- | --- |
| | SiC | MgO | Garnet | | Al₂O₃ | Er₂O₃ | | | |
| | | | Al₂O₃ | Er₂O₃ | | | | | |
| 1 | 95 | 3 | 1 | 1 | — | — | 87.2 | 41 | B |
| 2 | 94 | 3 | 1 | 2 | — | — | 98.8 | 84 | A |
| 3 | 92 | 3 | 3 | 2 | — | — | 98.5 | 68 | B |
| 4 | 86 | 3 | 1 | 10 | — | — | 99.1 | 88 | A |
| 5 | 93 | 3 | 2 | 2 | — | — | 98.9 | 88 | A |
| 6 | 85 | 3 | 2 | 10 | — | — | 99.3 | 89 | A |
| 7 | 83 | 3 | 2 | 12 | — | — | 99.1 | 83 | A |
| 8 | 80 | 3 | 2 | 15 | — | — | 92.3 | 59 | B |
| R9 | 94 | 3 | — | — | 1 | 2 | 97.7 | 81 | B |
| 10 | 85 | 3 | — | — | 2 | 10 | 98.7 | 80 | B |

*Mark A: Pore of about 0.5 μm
Mark B: Pore of about 2 μm
R: Comparison Examples

The preferred components of the component group A and amounts thereof are readily understood from those test results.

EXAMPLE 2

Aluminum oxide (having a purity of 99.9 wt. % and an average particle size of 0.4 microns) and erbium oxide (having a purity of 99 wt. % and an average particle size of 0.8 microns) were mixed together into the compositions (parts by weight) as shown in Table 4, and the resulting mixed powders were then heated at 1300° to 1600° C. for 3 to 10 hours to synthesize garnets. The thus obtained garnets were finely pulverized to an average particle size of 0.5 microns, and were then admixed with silicon carbide (having a purity of 99 wt. % and an average particle size of 0.4 microns) and magnesium oxide (having a purity of 99 wt. % and an average particle size of 0.7 microns) so as to prepare the compositions (parts by weight) as shown in Table 4, which were in turn wet-mixed and pulverized for 15 hours in a ball mill mixer, and were sufficiently dried into the materials for sintering. The materials were charged in a 50×50×60 (height) mm graphite mold, which was then inserted through a high-frequency coil and maintained there at a temperature of 1,950° C. under a pressure of 200 kg/cm for 60 minutes, and de-

EXAMPLE 3

3rd and 4th Aspects

Next, the test pieces of an alumina base material (70Al₂O₃-30TiC) and the invented material (Sample No. 2 in Table 3) were fixed in place by a jig, and were cut with a resinoid-bonded diamond grinding wheel, to which a 10 kg weight was attached through a pulley, to determine the time required to cut off it over a length of 50 mm under the action of the weight. In consequence, it has been found that if the time required to cut off the alumina base test piece over a length of 50 mm is 100, that for cutting the SiC base test piece is then only 32. This means that, although the invented material is hard, it takes a prominent position in respect of the machinability required for ceramic base head slider materials.

Next, the resultant product of the invented Sample No. 2 in Table 3 was shaped into a rectangular parallelopiped, 2×4 mm in section and 20 mm in length. with one end being shaped into the form of a sharp edge. Subsequently, the so-called pin-disc type abrasion testing was carried out substantially in the similar manner as in EXAMPLE 1, wherein the invented Sample No. 2 was used.

The abrasion testing was also applied to the conventional polycrystalline Mn-Zn ferrite base material (32MnO-15ZnO-52Fe$_2$O$_3$) and Al$_2$O$_3$-TiC base material. The results are illustrated in FIGS. 5 and 6.

Figure 5:
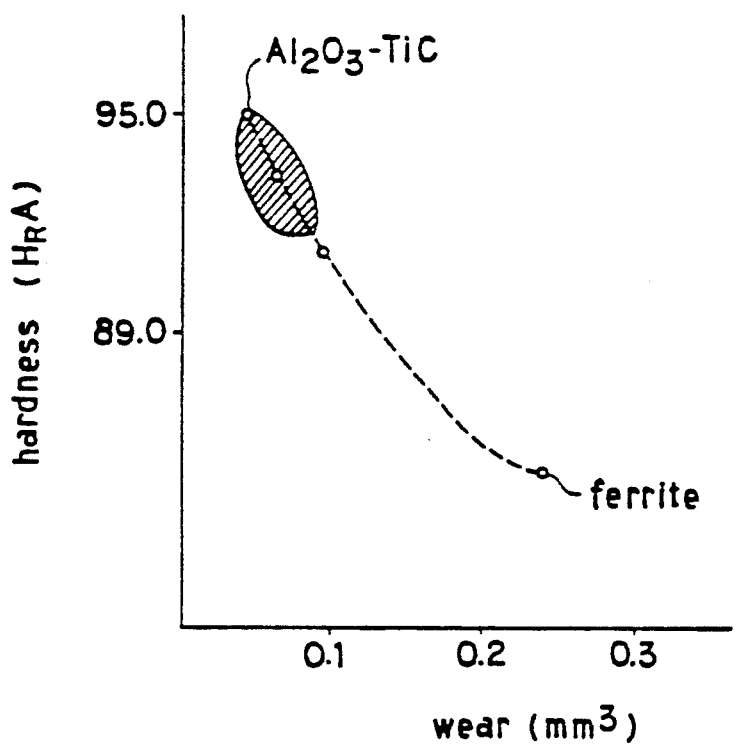
Figure 6:
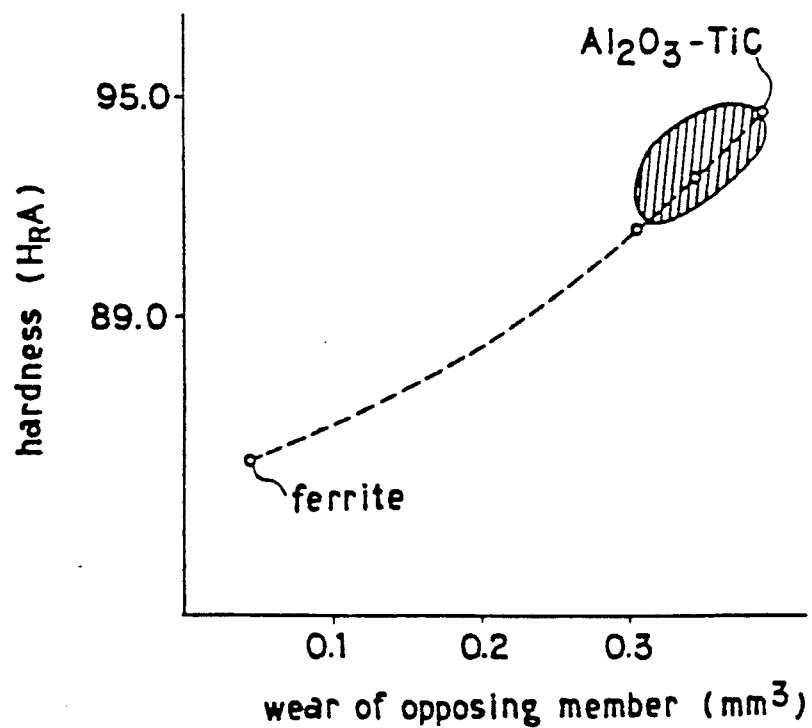

More specifically, FIG. 5 shows the relation between wear volume and hardness of magnetic head slider materials, and FIG. 6 illustrates the relation between the hardness of magnetic head slider materials and wear volume of the recording media. In FIGS. 5 ana 6, the hatched regions correspond approximately to the various properties the invented materials possess. As seen from FIGS. 5 and 6, the materials according to the present invention have a hardness shifting from the intermediate value lying between those of the prior art ferrite base material and the aforesaid Al$_2$O$_3$-TiC base material to a value near to that of the latter. In addition, they have the properties suitably applied as magnetic head slider materials, and excel in, in particular, compatibility (or affinity) and lubricating characteristics with respect to thin-film recording media (see Ex. 3). It is to be noted that the results of FIGS. 1 and 2 are similar to those of FIGS. 5 and 6, but the latter are slightly hard, and shift into a high wear-resistant region.

To the powder of SiC having a purity of 98.5% and, an average particle size of 0.5 microns were added, magnesium oxide powder in an amount of 3 wt. %, garnet type compound powder consisting of aluminum oxide and erbium oxide (Al$_2$O$_3$/Er$_2$O$_3$=2/5) in an amount of 7 wt. % and the second additive component(s) group A (or compound(s) thereof) which is (are) for further promotion of sintering, and which have similar compositions similar to those specified in Table 2 of Example 1, and the resulting compacts were sintered in the manner as mentioned above. The sintered bodies were then surface-ground with a diamond grinding wheel and lapped to observe the presence of pores by an optical microscope (×1000). The results were similar to those set forth in Table 2.

In the "pore" column of Table 2, Mark X indicates the presence of a large number of pores of more than about 2 microns) as observed at a magnification of ×1000, whereas Mark O stands for the substantial absence of any such pores (i.e., there are only pores having a diameter of no more than 0.5 microns). The fractures of the respective sintered bodies were examined by a scanning electron microscope for the examination of the crystal grain size thereof. In Table 2, the sintered bodies capable of being used as the materials for high-performance magnetic head slider materials (having an average crystal grain size of no more than 1 micron) are marked with O, whereas those unpreferred for such use are marked with X.

From Table 2 the preferable types and amounts of the second additive component(s) group A (or compound(s) thereof) are evidently appreciated.

Furthermore, similar results were obtained by carrying out the experiments similar to those mentioned in connection with Table 2, wherein as the starting material powders of SiC containing 0.5 to 2.0% by weight of free carbon were used.

As mentioned above, the materials according to the present aspects are best-suited for use in the materials for high-performance magnetic head slider, since they possess proper lubricating properties and wear resistance, good machinability and very small porosity. According to the present invention, such materials can be produced with ease and reliability.

In another experiments, to the powder of SiC having a purity of 98.5% and an average particle size of 0.5 microns were added garnet powder consisting of aluminum oxide and erbium oxide (Al$_2$O$_3$/Er$_2$O$_3$=2/5) in an amount of 7% by weight, MgO powder having a purity of 99.9% and an average particle size of 3 microns in an amount of 3% by weight and such various additives as specified in Table 5, and the resulting product were sintered in the manner as mentioned above. The sintered bodies were surface-ground with a diamond grinding wheel and lapped to observe the presence of pores by an optical microscope at a magnification of ×1000. In Table 5, Mark X indicates the presence of a large number of pores (or pores having a size of more than 2 microns), whereas Mark O stands for the substantial absence of any pores (or the presence of pores of no more than about 0.5 microns only). The fractures of the respective sintered bodies were examined by a scanning electron microscope. In Table 5, the sintered bodies (having an average crystal grain size of no more than 1 micron) capable of being used as the materials for high-performance magnetic head sliders in view of the crystal grain size are marked with O, whereas those unsuitable for such use are marked with X.

TABLE 5

| Various addition component(s) for sintering aid/ % by weight | Presence of pore | Crystal grain size |
| --- | --- | --- |
| B/1.0 | O | O |
| B/3.0 | O | X |
| B$_4$C/1.0 | O | O |
| B$_4$C/3.0 | O | X |
| Be/1.0 | O | O |
| Be/3.0 | O | X |
| BeO/1.0 | O | O |
| BeO/3.0 | O | X |
| BeO/1.0 B$_4$C/1.0 | O | O |
| BeO/2.0 B/2.0 | O | X |

Next, the formulations similar to those set forth in Table 5 were formed in a mold, presintered to 95% of relative theoretical density, and H.I.P sintered at 1950° C. in an argon atmosphere of 10,000 kg/cm$^2$ to make similar examinations. Similar results were then obtained.

Finally, the formulations similar to those set forth in Table 5 were formed in a mold, sintered to 2,100° C. under pressure in an argon gas atmosphere of 9.5 kg/cm$^2$, and sintered for 2 hours to make similar examinations. Similar results were then obtained.

EXAMPLE 3

Compatibility and Lubricating Properties Testings with respect to Tapes

Using heads—round heads of 5 mm radius—formed of three materials A. the invented product (SiC-Er$_2$O$_3$-Al$_2$O$_3$), and commercially available products B. (Al$_2$O$_3$-TiC) and C. (Ni-Zn soft ferrite), surface scrubbing testing (tension: 100-900 g, tape speed: 0.5-3.2 m/sec) was conducted with commercially available magnetic tapes in a Shoe-Shine Test —SST— method to examine abrasion wear and change in the read output of the tapes. The abrasion wear of the tapes after 10$^4$ cycles of surf ace scrubbing testing (SST) and the read output change after 10$^5$ cycles of SST are set forth in Table 6. From the results, it is noted that the invented product A excels in the compatibility and lubricating properties with respect to the magnetic tapes, even as compared with the soft ferrite, not to mention $Al_2O_3$-TiC, and hardly give any damage to the tapes.

The tapes used were gamma-$Fe_2O_3$ coating tapes for computers manufactured by a company K and a company L.

TABLE 6

| | Read Output (dB) After SST $10^5$ Cycles | | Wear Depth of Tape (μm) After SST $10^4$ Cycles |
|---|---|---|---|
| | K Tape | L Tape | |
| A | −1.99 | −1.31 | ~0 |
| B | −9.95 | −10.06 | 0.6 |
| C | −1.99 | −1.54 | 0.2 |

Similar testings were conducted with $Al_2O_3$-$TiO_2$ base, $Al_2O_3$-$Fe_2O_3$-TiC base and other base various ceramic head materials. The invented product A was found to be significantly improved, as compared with these conventional materials. Because the magnetic head slider contacts the recording disk only when it is stopped, the results of comparison testing with respect to tapes are considered to be relatively similar with the properties as the magnetic head slider.

It should be noted that modification may be made without departing from the gist and scope of the present invention as hereindisclosed and claimed hereinbelow.

What is claimed is:

1. A process for the production of a sintered material for recording/reading head slider comprising the steps of:
   preparing a powdery mixture which comprises 0.5 to 6.0% by weight of at least one component selected from the component group A consisting of Ti, V, Cr, Mn, Mg, Y, Zr, Nb, Mo, Ba, La, Ce, Gd, Hf, Ta, W, Th, and Cs and compounds thereof, 5 to 15% of erbium oxide, and the balance being silicon carbide powder, wherein said erbium oxide and said component group A are uniformly dispersed through said silicon carbide powder;
   forming a substantially micropore-free, highly densified sintered material by sintering the powder mixture.

2. A process for the production of a sintered material for recording/reading head slider comprising the steps of:
   preparing a powdery mixture which comprises 0.5 to 6.0% by weight of at least one component selected from the component group A consisting of Ti, V, Cr, Mn, Mg, Y, Zr, Nb, Mo, Ba, La, Ce, Gd, Hf, Ta, W, Th, and Cs and compounds thereof, 5 to 15% of erbium oxide, a further sintering aid comprising at least one of Be, BeO, B, $B_4C$, Al, AlN and $Al_2O_3$ in an amount of up to 2% by weight, and the balance being silicon carbide powder, wherein said erbium oxide, said component group A, and said sintering aid are uniformly dispersed through said silicon carbide powder;
   forming a substantially micropore-free, highly densified sintered material by sintering the powder mixture.

3. A process for the production of a sintered material for recording/reading head slider comprising the steps of:
   preparing a powdery mixture which comprises 0.5 to 6.0% by weight of at least one component selected from the component group A consisting of Ti, V, Cr, Mn, Mg, Y, Zr, Nb, Mo, Ba, La, Ce, Gd, Hf, Ta, W, Th, and Cs and compounds thereof, a compound of garnet crystal structure consisting essentially of erbium oxide and aluminum oxide in amounts of 2% to 12% by weight and up to 2% by weight based on the total composition, respectively, and expressed by the formula $Er_3(Al,Er)_2(AlO_4)_3$ through $(Er,Al)_3Al_2(AlO_4)_3$, and the balance being silicon carbide powder, wherein said compound of garnet crystal structure and said component group A are uniformly dispersed throughout said silicon carbide powder;
   forming a substantially micropore-free, highly densified sintered material by sintering the powder mixture under the application of high pressure.

4. A process for the production of a sintered material for recording/reading head slider comprising the steps of:
   preparing a powdery mixture which comprises 0.5 to 6.0% by weight of at least one component selected from the component group A consisting of Ti, V, Cr, Mn, Mg, Y, Zr, Nb, Mo, Ba, La, Ce, Gd, Hf, Ta, W, Th, and Cs and compounds thereof, a compound of garnet crystal structure consisting essentially of erbium oxide and aluminum oxide in amounts of 2% to 12% by weight and up to 2% by weight based on the total composition, respectively, and expressed by the formula $Er_3(Al,Er)_2(AlO_4)_3$ through $(Er,Al)_3Al_2(AlO_4)_3$, a further sintering aid comprising at least one of Be, BeO, B and $B_4C$ in an amount of up to 2% by weight, and the balance being silicon carbide powder, wherein said compound of garnet crystal structure, said sintering aid, and component group A are uniformly dispersed throughout said silicon carbide powder;
   forming a substantially micropore-free, highly densified sintered material by sintering the powder mixture under the application of high pressure.

5. A process as defined in any of claims 1, 2, 3 or 4, wherein said compounds for the component Group A are oxides, carbides, borides or nitrides.

6. A process as defined in claim 3 or 4, wherein the compound of garnet crystal structure amounts to 4–10% by weight.

7. A process as defined in claim 3 or 4, wherein said compound of garnet crystal structure is expressed by the formula $Er_3Al_2(AlO_4)_3$.

8. A process as defined in claim 3 or 4, wherein said compound of garnet crystal structure includes a minor amount of $Er_xAl_{(1-x)}O_3$ where x is smaller than one.

9. A process as defined in claim 3 or 4, wherein the process comprises a further step of preparing said compound of garnet crystal structure by solid phase reaction of a mixture of aluminum oxide and erbium oxide.

10. A process as defined in claim 9, wherein said solid phase reaction is effected at 1300°–1600° C.

11. A process as defined in claim 1 or 2, wherein the sintering is conducted at 2000°–2300° C. without applying kinetic force upon the mass to be sintered.

12. A process as defined in claim 1, 2, 3, or 4, wherein the sintering is conducted through hot-pressing (HP) or hot isostatic pressing (HIP) method.

13. A process as defined in claim 12, wherein the sintering is conducted at 1900°–2100° C.

14. A recording/reading head slider comprising a slider substrate member produced by the process as defined in any of claim 1, 2, 3 or 4.

15. A process as defined in claim 3 or 4, wherein said compound of garnet crystal structure is a synthetic compound.

16. A process as defined in claim 15, wherein the process comprises a further step of synthesizing said synthetic compound of garnet crystal structure by heating a mixture of erbium oxide and aluminum oxide with a ratio corresponding to said formula.

17. A process as defined in claim 16, wherein the synthesizing is conducted approximately at 1300°-1600° C.

18. A process as defined in claims 1 or 2, wherein the sintering is conducted at 1,900°-2,100° C. under the application of high pressure.

19. A method for reducing the growth of the crystal grains of a silicon carbide-containing material, comprising the steps of:
uniformly dispersing throughout a silicon carbide powder (1) 5 to 15% of erbium oxide and (2) 0.5 to 6.0% by weight of at least one group A component selected from Ti, V, Cr, Mn, Mg, Y, Zr, Nb, Mo, Ba, La, Ce, Gd, Hf, Ta, W, Th, and Cs; and
causing said erbium oxide and said group A component to reduce the growth of the crystal grains of said silicon carbide by sintering said silicon carbide powder in uniform dispersion with said erbium oxide and said group A component.

20. The method for reducing the growth of the crystal grains of a silicon carbide-containing material according to claim 19, further comprising uniformly dispersing through said silicon carbide powder from an amount up to 2% by weight of a sintering aid comprising at least one of Be, BeO, B, $B_4C$, Al, AlN and $Al_2O_3$ in conjunction with said erbium oxide and said group A component.

21. A method for reducing the growth of crystal grains of a silicon carbide-containing material, comprising the steps of:
uniformly dispersing throughout a silicon carbide powder (1) a compound of garnet crystal structure consisting essentially of erbium oxide and aluminum oxide in amounts of 2% to 12% by weight and up to 2% by weight based on the total composition, respectively, and expressed by the formula $Er_3(Al,Er)_2(AlO_4)_3$ through $(Er,Al)_3Al_2(AlO_4)_3$, and (2) 0.5 to 6.0% by weight of at least one group A component selected from Ti, V, Cr, Mn, Mg, Y, Zr, Nb, Mo, Ba, La, Ce, Gd, Hf, Ta, W, Th, and Cs; and
causing said compound of garnet crystal structure and said group A component to reduce growth of the crystal grains of said silicon carbide by sintering said silicon carbide powder in uniform dispersion with said compound of garnet crystal structure and said group A component.

22. The method for reducing the growth of the crystal grains of a silicon carbide-containing material according to claim 21, further comprising uniformly dispersing through said silicon carbide powder from an amount up to 2% by weight of a sintering aid comprising at least one of Be, BeO, B, $B_4C$, Al, AlN and $Al_2O_3$ in conjunction with said compound of garnet crystal structure and said group A component.

23. A method of increasing the density in relation to the theoretical density of a silicon carbide-containing material, comprising the steps of:
uniformly dispersing throughout a silicon carbide powder (1) 5 to 15% of erbium oxide and (2) 0.5 to 6.0% by weight of at least one group A component selected from Ti, V, Cr, Mn, Mg, Y, Zr, Nb, Mo, Ba, La, Ce, Gd, Hf, Ta, W, Th, and Cs; and
causing said erbium oxide and said group A component to reduce the number or size of the micropores of said silicon carbide crystal grains by sintering said uniformly dispersed silicon carbide-containing powder under the application of high pressure to form a substantially micropore free, highly densified sintered silicon carbide-containing material.

24. The method of increasing the density in relation to the theoretical density of a silicon carbide-containing material according to claim 23, further comprising uniformly dispersing throughout said silicon carbide powder from an amount up to 2% by weight of a sintering aid comprising at least one of Be, BeO, B, $B_4C$, Al, AlN and $Al_2O_3$ with said erbium oxide and said group A component.

25. A method of increasing the density in relation to the theoretical density of a silicon carbide-containing material, comprising the steps of:
uniformly dispersing throughout a silicon carbide powder (1) a compound of garnet crystal structure consisting essentially of erbium oxide and aluminum oxide in amounts of 2% to 12% by weight and up to 2% by weight based on the total composition, respectively, and expressed by the formula $Er_3(Al,Er)_2(AlO_4)_3$ through $(Er,Al)_3Al_2(AlO_4)_3$, and (2) 0.5 to 6.0% by weight of at least one group A component selected from Ti, V, Cr, Mn, Mg, Y, Zr, Nb, Mo, Ba, La, Ce, Gd, Hf, Ta, W, Th, and Cs; and
causing said compound of garnet crystal structure and said group A component to reduce the number or size of the micropores of said silicon carbide crystal grains by sintering said uniformly dispersed silicon carbide-containing powder under the application of high pressure to form a substantially micropore free, highly densified sintered silicon carbide-containing material.

26. The method of increasing the density in relation to the theoretical density of a silicon carbide-containing material according to claim 25, further comprising uniformly dispersing throughout said silicon carbide powder from an amount up to 2% by weight of a sintering aid comprising at least one of Be, BeO, B, $B_4C$, Al, AlN and $Al_2O_3$ with said compound of garnet crystal structure and said group A component.

27. The method for reducing the growth of the crystal grains of a silicon carbide-containing material according to claim 19, wherein said reduction of the growth of said crystal grains of said silicon carbide is such that there are substantially no pores having a diameter exceeding about 2 microns.

28. The method for reducing the growth of crystal grains of a silicon carbide-containing material according to claim 20, wherein said reduction of the growth of said crystal grains of said silicon carbide is such that there are substantially no pores having a diameter exceeding about 2 microns.

29. The method of increasing the density in relation to the theoretical density of a silicon carbide-containing material according to claim 23, wherein said reduction of the number or size of the micropores of said silicon carbide grains is such that there are substantially no pores having a diameter exceeding about 2 microns.

30. The method of increasing the density in relation to the theoretical density of a silicon carbide-containing material according to claim 24, wherein said reduction of the number or size of the micropores of said silicon carbide grains is such that there are substantially no pores having a diameter exceeding about 2 microns.

31. The method for reducing the growth of crystal grains of a silicon carbide-containing material according to claim 21, wherein said reduction of the growth of said crystal grains of said silicon carbide is such that there are substantially no pores having a diameter exceeding about 2 microns.

32. The method for reducing the growth of crystal grains of a silicon carbide-containing material according to claim 22, wherein said reduction of the growth of said crystal grains of said silicon carbide is such that there are substantially no pores having a diameter exceeding about 2 microns.

33. The method of increasing the density in relation to the theoretical density of a silicon carbide-containing material according to claim 25, wherein said reduction of the number or size of the micropores of said silicon carbide grains is such that there are substantially no pores having a diameter exceeding about 1 micron.

34. The method of increasing the density in relation to the theoretical density of a silicon carbide-containing material according to claim 26, wherein said reduction of the number or size of the micropores of said silicon carbide grains is such that there are substantially no pores having a diameter exceeding about 1 micron.

* * * * *